(12) United States Patent
Lee et al.

(10) Patent No.: US 12,503,086 B2
(45) Date of Patent: Dec. 23, 2025

(54) EMERGENCY BRAKING APPARATUS FOR VEHICLE, METHOD OF OPERATING THE SAME, AND SYSTEM INCLUDING THE SAME

(71) Applicants: Hyundai Motor Company, Seoul (KR); Kia Corporation, Seoul (KR)

(72) Inventors: Sung Wook Lee, Seoul (KR); Ho Hyun Cha, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 148 days.

(21) Appl. No.: 18/494,221

(22) Filed: Oct. 25, 2023

(65) Prior Publication Data

US 2024/0416876 A1    Dec. 19, 2024

(30) Foreign Application Priority Data

Jun. 16, 2023    (KR) .......................... 10-2023-0077745

(51) Int. Cl.
*B60T 7/22*    (2006.01)
*B60T 8/171*    (2006.01)
*B60T 8/172*    (2006.01)
*B60W 30/09*    (2012.01)

(52) U.S. Cl.
CPC ................ *B60T 7/22* (2013.01); *B60T 8/171* (2013.01); *B60T 8/172* (2013.01); *B60W 30/09* (2013.01)

(58) Field of Classification Search
CPC ............ B60T 7/22; B60T 8/171; B60T 8/172; B60W 30/09; G05D 1/0061; G05D 1/0088; G05D 1/021; G05D 1/0214; G05D 1/0221; G05D 1/0223
See application file for complete search history.

(56) References Cited

U.S. PATENT DOCUMENTS 10,814,845 B2 * 10/2020 Ji .......................... B60W 30/09
2019/0389443 A1 * 12/2019 Foitzik .................. B60T 17/221

* cited by examiner

*Primary Examiner* — Mark L. Greene
(74) *Attorney, Agent, or Firm* — SLATER MATSIL, LLP

(57) ABSTRACT

An embodiment emergency braking apparatus for a vehicle includes a memory storing a required control amount determination algorithm for non-occurrence of a judder and a required control amount determination algorithm for occurrence of the judder and an emergency braking controller that determines whether the judder occurs based on judder prediction information, determines whether a current situation is a dangerous situation based on vehicle forward detection information and a dangerous situation determination criterion for the occurrence of the judder, operates based on the required control amount determination algorithm for the occurrence of the judder, determines a primary required control amount based on the required control amount determination algorithm for the non-occurrence of the judder, selects a compensation coefficient corresponding to a judder magnitude, determines a compensation value based on the compensation coefficient, and determines a final required control amount by applying the compensation value to the primary required control amount.

20 Claims, 8 Drawing Sheets

EMERGENCY BRAKING APPARATUS FOR VEHICLE, METHOD OF OPERATING THE SAME, AND SYSTEM INCLUDING THE SAME

CROSS-REFERENCE TO RELATED APPLICATIONS

This application claims the benefit of Korean Patent Application No. 10-2023-0077745, filed on Jun. 16, 2023, which application is hereby incorporated herein by reference.

TECHNICAL FIELD

The present invention relates to an emergency braking apparatus for a vehicle, a method of operating the same, and a system including the same.

BACKGROUND

A brake judder refers to a defect caused by the occurrence of brake torque variation between a caliper and a disc because of a disc thickness deviation (DTV), and the brake judder causes vehicle body rattling, brake pedal rattling, steering rattling, and the like.

When the brake judder occurs, hydraulic pressure of a caliper piston cannot be effectively transmitted to the disc, and braking performance deteriorates under the same braking condition.

Even in the related art, studies have been conducted on brake judder detection technologies. However, because the brake judder detection cannot be associated with braking control, it is very difficult to generate the same required deceleration.

For example, when a dangerous situation is determined, a forward collision-avoidance assist (FCA) system transmits required deceleration for emergency braking to an electronic stability control (ESC) controller and allows the ESC controller to perform the braking control to satisfy the required deceleration.

However, when a brake judder occurs, the ESC controller cannot perform the braking control appropriate to the required deceleration from the FCA system even though the ESC controller performs the braking control. Further, there is a limitation in protecting a passenger by means of emergency braking.

As described above, when the braking performance is degraded by the brake judder, the FCA emergency braking cannot be performed smoothly.

In particular, when the judder occurs, an FCA emergency braking logic in the related art cannot transmit an appropriate required deceleration value to the ESC controller and cannot transmit an appropriate yaw rate compensation value for braking yaw moment of force that may be generated in each wheel by the judder. For this reason, there is a problem in that the FCA emergency braking logic cannot consider the deterioration (or degradation) in braking performance caused by the judder, and there is a limitation in terms of dangerous situation determination accuracy.

The above-mentioned background art is technical information that the inventors have retained to derive embodiments of the present invention or have obtained in the course of deriving the embodiments of the present invention, and cannot be thus said to be technical information publicly known to the public before filing of the application.

SUMMARY

The present invention relates to vehicle emergency braking. Particular embodiments relate to an emergency braking apparatus for a vehicle, a method of operating the same, and a system including the same, which are implemented to associate the occurrence of a brake judder with FCA emergency braking.

Embodiments of the present invention can solve problems in the art and provide an emergency braking apparatus for a vehicle, a method of operating the same, and a system including the same, which are implemented to associate the occurrence of a brake judder with FCA emergency braking.

Embodiments of the present invention also provide an emergency braking apparatus for a vehicle, a method of operating the same, and a system including the same, which are implemented to perform FCA emergency braking by applying a predicted brake judder occurrence.

Embodiments of the present invention also provide an emergency braking apparatus for a vehicle, a method of operating the same, and a system including the same, which are implemented to determine a dangerous situation in consideration of a predicted brake judder occurrence.

Embodiments of the present invention also provide an emergency braking apparatus for a vehicle, a method of operating the same, and a system including the same, which may determine required deceleration and yaw rate compensation values required for FCA emergency braking on the basis of a predicted brake judder occurrence.

Technical problems solvable by embodiments of the present invention are not limited to the above-mentioned technical problems, and other technical problems solvable by the present invention may also be clearly understood from the following descriptions by those skilled in the art to which the present invention pertains.

As the technical means for solving the technical problems, it is possible to provide an emergency braking apparatus for a vehicle, a method of operating the same, and a system including the same, which are implemented to associate the occurrence of the brake judder with FCA emergency braking.

An emergency braking apparatus for a vehicle according to an embodiment may include a memory configured to store a required control amount determination algorithm for non-occurrence of a judder and a required control amount determination algorithm for occurrence of a judder, and an emergency braking controller configured to determine whether the judder occurs on the basis of judder prediction information, determine whether a current situation is a dangerous situation on the basis of vehicle forward detection information and a dangerous situation determination criterion for the occurrence of the judder when the judder occurs, and operate on the basis of the required control amount determination algorithm for the occurrence of the judder when it is determined that the current situation is the dangerous situation.

According to an embodiment, the emergency braking controller may determine a primary required control amount on the basis of the required control amount determination algorithm for the non-occurrence of the judder, select a compensation coefficient corresponding to a judder magnitude, determine a compensation value on the basis of the compensation coefficient, and then determine a final required control amount by applying the compensation value to the primary required control amount.

According to an embodiment, when the judder occurs, the emergency braking controller may change a preset time-tocollision (TTC) critical value, among the dangerous situation determination criteria, to a TTC critical value corresponding to the judder magnitude on the basis of a TTC critical value look-up table for respective judder magnitudes, compare the current TTC with the changed TTC critical value, and determine that the current situation is the dangerous situation when the current TTC is smaller than the changed TTC critical value.

According to an embodiment, when the judder occurs, the emergency braking controller may change a preset emergency braking operating area, among the dangerous situation determination criteria, so that the preset emergency braking operating area corresponds to braking deceleration corresponding to the judder magnitude on the basis of a braking deceleration look-up table for respective judder magnitudes, and the emergency braking controller may determine that the current situation is the dangerous situation when a relative distance between a host vehicle and a front object, which is determined on the basis of the braking deceleration and detection information, corresponds to the changed emergency braking operating area.

According to an embodiment, the emergency braking controller may select the compensation coefficient corresponding to the judder magnitude on the basis of a compensation coefficient look-up table for respective judder magnitudes and determine the compensation value on the basis of Equation 3 (described later).

According to an embodiment, the emergency braking controller may determine the final required control amount through the addition calculation of the primary required control amount and the compensation value.

According to an embodiment, when the judder does not occur, the emergency braking controller may determine whether the current situation is the dangerous situation on the basis of the vehicle forward detection information and the dangerous situation determination criterion for the non-occurrence of the judder and determine the required control amount on the basis of the required control amount determination algorithm for the non-occurrence of the judder when it is determined that the current situation is the dangerous situation.

According to an embodiment, the emergency braking controller may determine required deceleration and a required yaw rate as the required control amounts and determine final required deceleration and a final required yaw rate by applying a deceleration compensation value and a yaw rate compensation value to a primary required deceleration and a determined primary required yaw rate.

A method of operating an emergency braking apparatus for a vehicle according to another embodiment may include determining whether a judder occurs on the basis of judder prediction information, determining whether the current situation is a dangerous situation on the basis of vehicle forward detection information and a dangerous situation determination criterion for the occurrence of the judder when it is determined that the judder occurs, and operating on the basis of a required control amount determination algorithm for the occurrence of the judder when it is determined that the current situation is the dangerous situation.

According to an embodiment, the operating on the basis of the required control amount determination algorithm for the occurrence of the judder may include determining a primary required control amount for the non-occurrence of the judder, selecting a compensation coefficient corresponding to a judder magnitude, determining a compensation value on the basis of the compensation coefficient, and determining a final required control amount by applying the compensation value to the primary required control amount.

According to an embodiment, the determining of whether the current situation is the dangerous situation may include changing a preset time-to-collision (TTC) critical value, among the dangerous situation determination criteria, to a TTC critical value corresponding to the judder magnitude on the basis of a TTC critical value look-up table for respective judder magnitudes, comparing the current TTC with the changed TTC critical value, and determining that the current situation is the dangerous situation when the current TTC is smaller than the changed TTC critical value.

According to an embodiment, the determining of whether the current situation is the dangerous situation may include changing a preset emergency braking operating area, among the dangerous situation determination criteria, so that the preset emergency braking operating area corresponds to braking deceleration corresponding to the judder magnitude on the basis of a braking deceleration look-up table for respective judder magnitudes, and determining that the current situation is the dangerous situation when a relative distance between a host vehicle and a front object, which is determined on the basis of the braking deceleration and detection information, corresponds to the changed emergency braking operating area.

According to an embodiment, the determining of the compensation value may include selecting the compensation coefficient corresponding to the judder magnitude on the basis of a compensation coefficient look-up table for respective judder magnitudes and determining the compensation value on the basis of Equation 3 (described later).

According to an embodiment, the determining of the final required control amount may include determining the final required control amount through the addition calculation of the primary required control amount and the compensation value.

According to an embodiment, the method may include determining whether the current situation is the dangerous situation on the basis of the vehicle forward detection information and the dangerous situation determination criterion for the non-occurrence of the judder when it is determined that the judder does not occur and determining the required control amount on the basis of the required control amount determination algorithm for the non-occurrence of the judder when it is determined that the current situation is the dangerous situation.

According to an embodiment, the operating on the basis of the required control amount determination algorithm for the occurrence of the judder may include determining required deceleration and a required yaw rate as the required control amounts and determining final required deceleration and a final required yaw rate by applying a deceleration compensation value and a yaw rate compensation value to a primary required deceleration and a primary required yaw rate.

An emergency braking system for a vehicle according to still another embodiment may include a judder occurrence prediction part configured to predict the occurrence of a judder on the basis of a brake judder occurrence prediction factor and output judder prediction information, a front detection part configured to detect an object positioned in front of a vehicle and output detection information, a vehicle sensor part configured to acquire state information of the vehicle and output the state information of the vehicle, and the emergency braking apparatus for a vehicle according to embodiments of the present invention.

According to an embodiment, the judder occurrence prediction part may be an electronic stability control (ESC) controller, and the emergency braking apparatus for a vehicle may be a forward collision-avoidance assist (FCA) system.

According to an embodiment, when the judder occurrence prediction part predicts the occurrence of the judder, the judder occurrence prediction part may output the judder prediction information including a judder magnitude.

Specific details in accordance with various examples of embodiments of the present invention, in addition to means of solving the above-mentioned problems, are included in the following description and drawings.

The embodiments of the present invention may provide the emergency braking apparatus for a vehicle, the method of operating the same, and the system including the same, which are implemented to associate the occurrence of the brake judder with the FCA emergency braking.

According to an embodiment, the FCA braking determination time point (TCC critical value) is adjusted by applying the predicted brake judder occurrence, which may ensure the FAC emergency braking performance even in the event of the occurrence of the judder.

In addition, the FCA operating area is adjusted by applying the predicted brake judder occurrence, which may improve the FCA emergency braking performance even in the event of the occurrence of the judder.

In addition, the emergency braking may be performed by applying the deceleration compensation value and the yaw rate compensation value, which are required for the FCA emergency braking, to the required deceleration and the required yaw rate on the basis of the predicted brake judder occurrence, thereby reducing the braking distance and the braking yaw moment of force and improving the FCA braking performance.

The effects of embodiments of the present invention are not limited to the aforementioned effects, and other effects, which are not mentioned above, may be clearly understood by those skilled in the art from the following descriptions.

The above-mentioned description of the problems to be solved, the means of solving the problems, and the effects are not essential features of the claims, and therefore the scope of the claims is not limited by the description thereof.

BRIEF DESCRIPTION OF THE DRAWINGS

The following accompanying drawings are provided to help understand embodiments of the present invention, and the embodiments are provided together with the detailed description. However, technical features of the present embodiments are not limited to the particular drawings, and the features illustrated in the respective drawings may be combined to constitute a new embodiment.

DETAILED DESCRIPTION OF ILLUSTRATIVE EMBODIMENTS

Figure 1:
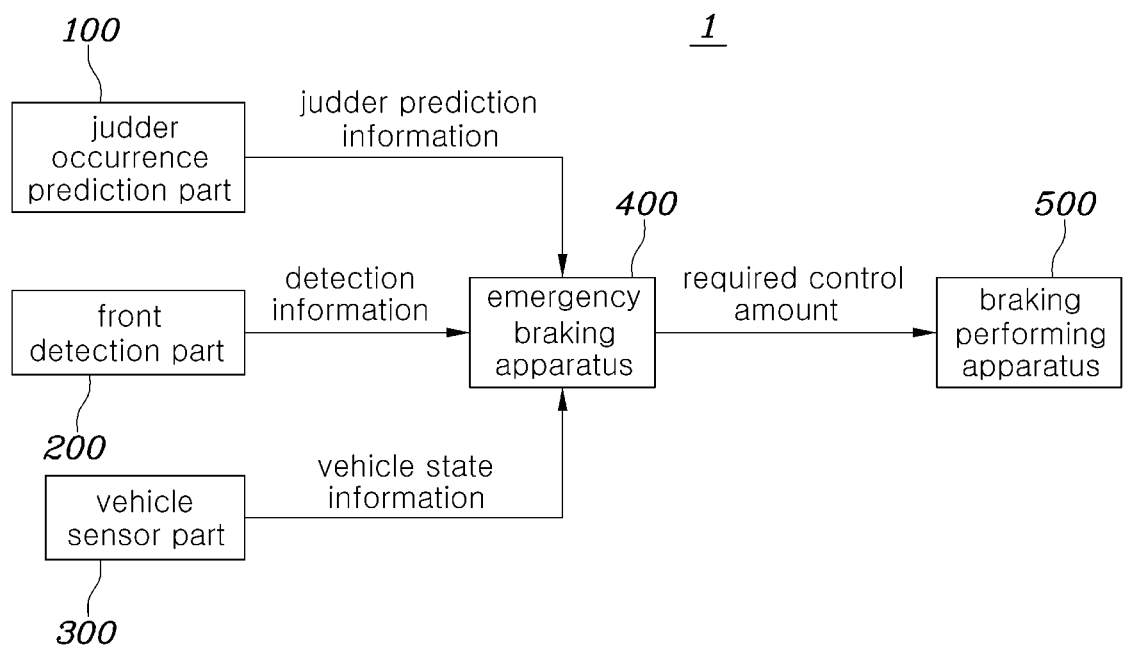
FIG. 1 is a view illustrating a configuration of an emergency braking system for a vehicle according to an embodiment of the present invention.

Advantages and features of embodiments of the present invention and methods of achieving the advantages and features will be clear with reference to embodiments described in detail below together with the accompanying drawings. However, the embodiments of the present invention are not limited to the embodiments disclosed herein but will be implemented in various forms. The embodiments of the present invention are provided so that the present invention is completely disclosed, and a person with ordinary skill in the art to which the present invention pertains can fully understand the scope of the embodiments of the present invention. The embodiments of the present invention will be defined only by the scope of the appended claims.

Shapes, sizes, ratios, angles, numbers, and the like illustrated in the drawings for explaining the embodiments of the present invention are just exemplarily illustrated, and embodiments of the present invention are not limited to the contents illustrated in the drawings. Throughout the specification, the same reference numerals denote the same constituent elements. In addition, in the description of embodiments of the present invention, the specific descriptions of publicly known related technologies will be omitted when it is determined that the specific descriptions may unnecessarily obscure the subject matter of the embodiments of the present invention. The terms "comprise," "have," or "include" used in the present specification may mean that other constituent elements can be added unless these terms are used with the term "only". Unless otherwise particularly and clearly stated, the singular expressions used herein are intended to include the plural expressions.

Unless otherwise separately and explicitly stated in respect to error ranges, analyses of constituent elements are interpreted as including the error ranges.

For example, in the description of a temporal relationship, for example, when a temporal relationship between two time points is described by using the terms "after," "following," "next to," "before," and the like, the two time points may not be continuous when the term "immediately" or "directly" is not used.

The terms "first", "second", and the like may be used to describe various constituent elements, but the constituent elements are not limited by these terms. These terms are merely used to distinguish one component from another component. Therefore, the first constituent element mentioned hereinafter may be the second constituent element within the technical spirit of embodiments of the present invention.

The terms such as first, second, A, B, (a), and (b) may be used to describe constituent elements of embodiments of the present invention. These terms are used only for the purpose of discriminating one constituent element from another constituent element, and the nature, the sequences, the orders, or the number of the constituent elements are not limited by the terms. When one constituent element is described as being "connected," "coupled," or "attached" to another constituent element, it should be understood that one constituent element can be connected or attached directly to another constituent element, one constituent element can be connected or attached indirectly to another constituent element, or an intervening constituent element can also be "interposed" between the constituent elements unless otherwise explicitly and particularly stated.

It should be understood that the term "at least one" includes any combination of one or more associated constituent elements. For example, the meaning of "at least one of the first, second, and third constituent elements" includes not only the first, second, or third constituent element, but also any combination of two or more constituent elements among the first, second, and third constituent elements.

Respective features of several embodiments of the present specification may be partially or entirely coupled to or combined with each other, and various technical cooperation and operations may be made, and the respective embodiments may be carried out independently of each other or carried out together correlatively.

Hereinafter, the embodiments of the present invention will be described with reference to the accompanying drawings and embodiments. The scales of the constituent elements illustrated in the drawings are different from actual scales for convenience of description. Therefore, embodiments of the present invention are not limited to the scales illustrated in the drawings.

Hereinafter, an emergency braking apparatus for a vehicle, a method of operating the same, and a system including the same according to embodiments of the present invention will be described with reference to the accompanying drawings.

FIG. 1 is a view illustrating a configuration of an emergency braking system 1 for a vehicle according to an embodiment of the present invention.

The emergency braking system 1 for a vehicle according to the embodiment may be implemented to associate the occurrence of a brake judder with FCA emergency braking. In particular, the emergency braking system 1 may be implemented to perform the FCA emergency braking by applying a predicted brake judder occurrence.

In addition, the emergency braking system 1 may be implemented to determine a dangerous situation in consideration of the predicted brake judder occurrence and implemented to determine required deceleration and a yaw rate compensation value required for the FCA emergency braking on the basis of the predicted brake judder occurrence.

With reference to FIG. 1, the emergency braking system 1 may include a judder occurrence prediction part 100, a front detection part 200, a vehicle sensor part 300, an emergency braking apparatus 400, and a braking performing apparatus 500. However, the configuration of the emergency braking system 1 is not limited thereto.

The judder occurrence prediction part 100 according to an embodiment may predict the occurrence of a brake judder. For example, the judder occurrence prediction part 100 may predict the occurrence of the brake judder for each of the four vehicle wheels FL, FR, RL, and RR.

For example, the judder occurrence prediction part 100 may be an electronic stability control (ESC) controller mounted in a vehicle or a device separately provided to predict the occurrence of a judder.

According to an embodiment, the judder occurrence prediction part 100 may predict the occurrence of the brake judder on the basis of factors such as a brake pedal control amount, an accelerator pedal control amount, steering torque, a steering angle, and a vehicle speed. However, the brake judder occurrence prediction factor is not limited thereto.

The judder occurrence prediction part 100 may predict the occurrence of the brake judder on the basis of the brake judder occurrence prediction factor. When the judder occurrence prediction part 100 predicts the occurrence of the brake judder, the judder occurrence prediction part 100 may determine a judder magnitude (or intensity).

The judder occurrence prediction part 100 may output (provide) judder prediction information (hereinafter, referred to as judder occurrence prediction information or prediction information) with respect to a brake of each of the four vehicle wheels FL, FR, RL, and RR to the emergency braking apparatus 400.

In this case, the judder prediction information may be outputted when the occurrence of the judder is predicted. The judder prediction information may include brake information, judder magnitude information, and the like.

The judder occurrence prediction part 100 may output the judder prediction information for each of the brakes of the four wheels FL, FR, RL, and RR.

For example, the judder occurrence prediction part 100 may output front left/right judder prediction information when the judder occurrence prediction part 100 predicts the occurrence of the judder on front left/right brakes. The judder occurrence prediction part 100 may output rear left/right judder prediction information when the judder occurrence prediction part 100 predicts the occurrence of the judder on rear left/right brakes.

For example, the front left brake may be expressed as a first brake (or FL brake), and the front right brake may be expressed as a second brake (or FR brake). Further, the rear left brake may be expressed as a third brake (or RL brake), and the rear right brake may be expressed as a fourth brake (or RR brake).

Similarly, the front left judder prediction information may be expressed as first judder prediction information (or FL judder prediction information), and the front right judder prediction information may be expressed as second judder prediction information (or FR judder prediction information). Further, the rear left judder prediction information may be expressed as third judder prediction information (or RL judder prediction information), and the rear right judder prediction information may be expressed as fourth judder prediction information (or RR judder prediction information).

The front detection part 200 according to an embodiment may detect an object (or an obstacle, an object, or a target) positioned in front of the vehicle. For example, the front detection part 200 may detect a front vehicle positioned in front of the vehicle and determine relative information (e.g., a relative distance, a relative velocity, etc.) with respect to the front vehicle.

The front detection part 200 may output (or provide) detection information (or vehicle forward detection information) to the emergency braking apparatus 400. For example, the detection information may include information on whether a front object is detected, relative information with respect to an object, and the like. However, the information included in the detection information is not limited thereto.

For example, the front detection part 200 may include a radar sensor, a lidar sensor, an infrared sensor, an ultrasonic sensor, a camera, or the like. However, the constituent elements of the front detection part 200 are not limited thereto.

For example, the vehicle sensor part 300 according to an embodiment may acquire (or collect) state information of the vehicle through networks for a vehicle such as a controller area network (CAN), a local interconnect network (LIN), and FlexRay.

For example, the vehicle sensor part 300 may acquire acceleration, an angular velocity, a steering angle of a steering wheel, a yaw rate, engine torque, brake air pressure, tire air pressure, engine RPM (revolution per minute), a vehicle weight, and the like. However, the information acquired by the vehicle sensor part 300 is not limited thereto.

For example, the vehicle sensor part 300 may include a vehicle velocity sensor, a wheel speed sensor, a longitudinal/transverse acceleration sensor, a master cylinder pressure sensor, a steering angle detection sensor, a steering speed detection sensor, a vehicle weight sensor, and the like. However, the constituent elements of the vehicle sensor part 300 are not limited thereto.

The vehicle sensor part 300 may output (or provide) the acquired vehicle state information to the emergency braking apparatus 400.

According to an embodiment, the information acquired by the vehicle sensor part 300 may be partially identical to information inputted to the judder occurrence prediction part 100. The vehicle sensor part 300 may provide the judder occurrence prediction part 100 with information preset on the basis of the brake judder occurrence prediction factor among the pieces of vehicle state information.

The emergency braking apparatus 400 according to an embodiment may determine whether to perform emergency braking on the basis of information (judder prediction information, detection information, and vehicle state information) inputted (or provided) from information provision parts 100, 200, and 300 at the front end, determine a control amount (a required control amount) required for the emergency braking, and output the control amount to the braking performing apparatus 500.

For example, the emergency braking apparatus 400 may be implemented as a forward collision-avoidance assist (FCA) system and expressed as a high-level controller, a first controller, or the like.

When it is determined that the situation determined on the basis of the input information is a preset dangerous situation, the emergency braking apparatus 400 may perform an operation for the emergency braking.

The emergency braking apparatus 400 may determine time-to-collision (TTC) with respect to the front object on the basis of the detection information, compare the time-to-collision with a preset TTC critical value, and determine that the current situation is a dangerous situation (or a situation requiring emergency braking) when the time-to-collision is smaller than the TTC critical value.

In addition, the emergency braking apparatus 400 may determine whether an FCA operation determination target value determined on the basis of the detection information corresponds to a preset emergency braking (FCA) operating area. The emergency braking apparatus 400 may determine that the current situation is the dangerous situation (or the situation requiring emergency braking) when the FCA operation determination target value corresponds to the emergency braking operating area.

According to an embodiment, the emergency braking apparatus 400 may apply different criteria for the dangerous situation determination depending on whether the judder prediction information is inputted.

When the judder prediction information is not inputted, the emergency braking apparatus 400 may use a preset TTC critical value for the non-occurrence of the judder and a preset FCA operating area for the non-occurrence of the judder as the criteria for the dangerous situation determination.

When the judder prediction information is inputted, the emergency braking apparatus 400 may change (adjust) the TTC critical value and the FCA operating area used as the criteria for the non-occurrence of the judder, and the emergency braking apparatus 400 may determine the dangerous situation on the basis of the changed TTC critical value and the changed FCA operating area.

According to an embodiment, the emergency braking apparatus 400 may store a look-up table (a TTC critical value look-up table for respective judder magnitudes) related to TTC critical values for respective judder magnitudes designed through a previous braking test.

Therefore, the emergency braking apparatus 400 may select an appropriate TTC critical value from the TTC critical value look-up table for respective judder magnitudes on the basis of the judder magnitude of the inputted judder prediction information, compare the current TTC with the selected TTC critical value, and determine that the current situation is the dangerous situation (or the situation requiring emergency braking).

According to an embodiment, the emergency braking apparatus 400 may store the TTC critical value look-up table designed on the basis of the judder magnitude and the required deceleration.

When the TTC critical value look-up table designed on the basis of the two variables (the judder magnitude and the required deceleration) is used as described above, the accurate emergency braking may be performed in comparison with a case in which a TTC critical value look-up table designed on the basis of a single variable (judder magnitude) is used.

According to an embodiment, the emergency braking apparatus 400 may store a look-up table (a braking deceleration look-up table for respective judder magnitudes) related to decreasing braking deceleration ($\alpha_{jud}$) for respective judder magnitudes acquired through a previous braking test.

Therefore, the emergency braking apparatus 400 may select appropriate braking deceleration ($\alpha_{jud}$) from the braking deceleration look-up table for respective judder magnitudes on the basis of the judder magnitude of the inputted judder prediction information and adjust the emergency braking operating area so that the emergency braking operating area corresponds to the selected braking deceleration ($\alpha_{jud}$).

Further, the emergency braking apparatus 400 may determine whether the FCA operation determination target value corresponds to the adjusted emergency braking operating area, and the emergency braking apparatus 400 may determine whether the current situation is the dangerous situation (or the situation requiring emergency braking).

According to an embodiment, when the current situation is the dangerous situation (or the situation requiring emergency braking), the emergency braking apparatus 400 may determine the required control amount on the basis of the inputted information. For example, the control amount may include the deceleration and the yaw rate. However, the parameter of the control amount is not limited thereto. Therefore, the emergency braking apparatus 400 may determine the required deceleration and the required yaw rate.

The emergency braking apparatus 400 may apply different methods of determining the required control amount depending on whether the judder prediction information is inputted.

According to an embodiment, when the judder prediction information is not inputted, the emergency braking apparatus 400 may determine the required control amount on the basis of a required control amount determination algorithm for the non-occurrence of the judder.

In this case, the required control amount determination algorithm for the non-occurrence of the judder may mean an algorithm for determining the required control amount at the time of publicly-known general FCA braking. A detailed description of the required control amount determination algorithm for the non-occurrence of the judder will be omitted.

When the judder prediction information is inputted, the emergency braking apparatus 400 may determine the required control amount on the basis of the required control amount determination algorithm for the occurrence of the judder proposed in embodiments of the present invention.

To this end, the emergency braking apparatus 400 may store a look-up table (compensation coefficient look-up table for respective judder magnitudes) related to compensation coefficients K for respective judder magnitudes acquired through a previous braking test.

According to an embodiment, the emergency braking apparatus 400 may store a deceleration compensation coefficient look-up table for respective judder magnitudes and a yaw rate compensation coefficient look-up table for respective judder magnitudes.

A required control amount determination method for the occurrence of the judder proposed in embodiments of the present invention will be specifically described. The emergency braking apparatus 400 may primarily determine the required control amount on the basis of the required control amount determination algorithm for the non-occurrence of the judder.

Further, the emergency braking apparatus 400 may select the compensation coefficients K related to the deceleration and the yaw rate on the basis of the judder magnitude of the judder prediction information and determine the compensation values for the deceleration and the yaw rate by applying the selected compensation coefficients K.

Thereafter, the emergency braking apparatus 400 may secondarily (or finally) determine a required control amount (a secondary required control amount or a final required control amount) by applying the compensation value to a primarily determined required control amount (a primary required control amount or an intermediate required control amount).

According to an embodiment, the emergency braking apparatus 400 may provide judder occurrence information to a preset terminal (e.g., a driver terminal). For example, the judder occurrence information may include whether the judder occurs for each wheel, a judder magnitude, a compensation value, a final required control amount, and the like. However, the information included in the judder occurrence information is not limited thereto.

The braking performing apparatus 500 (or a low-level controller) according to an embodiment may receive the required control amount outputted from the emergency braking apparatus 400 and perform the emergency braking on the basis of the inputted required control amount.

For example, the braking performing apparatus 500 may be an electronic stability control (ESC) controller mounted in the vehicle.

Figure 2:
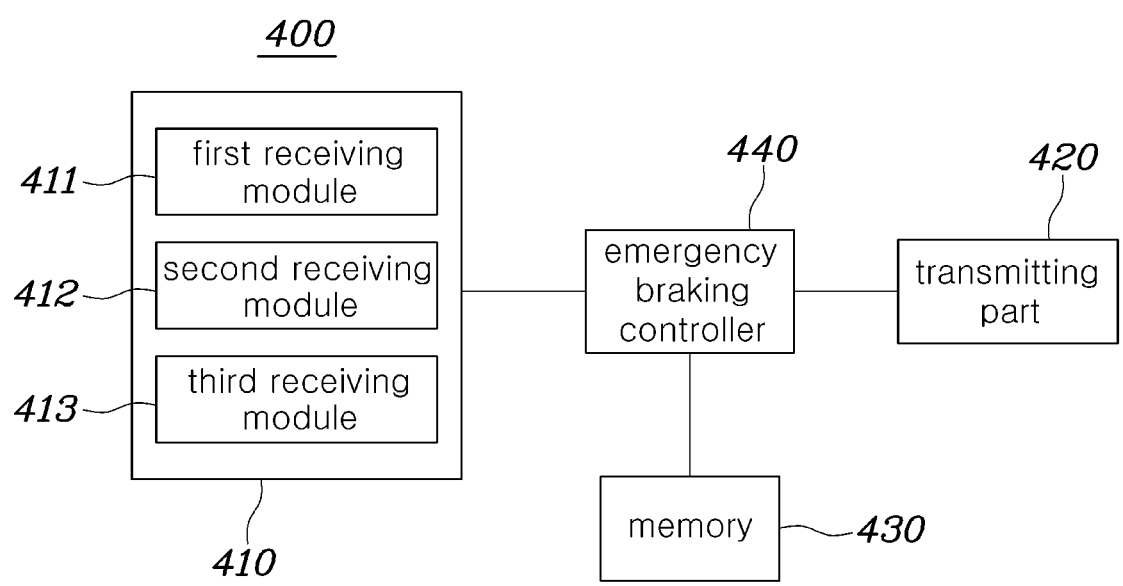
FIG. 2 is a view illustrating a configuration of an emergency braking apparatus for a vehicle of the emergency braking system for a vehicle according to an embodiment of the present invention.

FIG. 2 is a view illustrating a configuration of the emergency braking apparatus 400 for a vehicle of the emergency braking system 1 for a vehicle according to an embodiment of the present invention.

With reference to FIGS. 1 and 2, the emergency braking apparatus 400 according to an embodiment may determine whether the emergency braking is required on the basis of information inputted from the outside, determine the required control amount for the emergency braking, and output the determination result to the braking performing apparatus 500.

To this end, the emergency braking apparatus 400 may receive the judder prediction information outputted from the judder occurrence prediction part 100, receive the detection information outputted from the front detection part 200, and receive the vehicle state information outputted from the vehicle sensor part 300.

When the emergency braking apparatus 400 determines that the situation determined on the basis of the inputted information is a preset dangerous situation, the emergency braking apparatus 400 may determine the required control amount for the emergency braking and output the determination result to the braking performing apparatus 500.

According to an embodiment, the emergency braking apparatus 400 may include a receiving part 410, a transmitting part 420, a memory 430, and an emergency braking controller 440. However, the configuration of the emergency braking apparatus 400 is not limited thereto.

The receiving part 410 (or a first communication part) according to an embodiment may receive the information from the outside and transfer the received information to the emergency braking controller 440.

For example, the receiving part 410 may include a first receiving module 411 configured to receive the information outputted from the judder occurrence prediction part 100, a second receiving module 412 configured to receive the information outputted from the front detection part 200, and a third receiving module 413 configured to receive the information outputted from the vehicle sensor part 300.

The transmitting part 420 (or a second communication part) according to an embodiment may receive the information provided from the emergency braking controller 440 and transfer the received information to the outside.

For example, the transmitting part 420 may provide the braking performing apparatus 500 with the required control amount provided from the emergency braking controller 440.

The memory 430 according to an embodiment may store algorithms for performing the operation of the emergency braking controller 440 (e.g., a dangerous situation determination algorithm, a parameter adjustment algorithm for predicting the judder, the required control amount determination algorithm for the non-occurrence of the judder, the required control amount determination algorithm for the occurrence of the judder, etc.) and a result of performing the operation of the emergency braking controller 440.

In addition, the memory 430 may store various types of information required for operations. For example, the memory 430 may store the TTC critical value look-up table for respective judder magnitudes, the braking deceleration look-up table for respective judder magnitudes, the compensation coefficient look-up table for respective judder magnitudes, and the like.

For example, the operation performing algorithm stored in the memory 430 may be implemented on the basis of results acquired through many experiments.

The memory 430 may include a storage medium of at least one type among memories of types such as a flash memory, a hard disk, a micro memory, a card (e.g., a secure digital (SD) card or an extreme digital (XD) card) memory, a random-access memory (RAM), a static RAM (SRAM), a read-only memory (ROM), a programmable ROM (PROM), an electrically erasable PROM (EEPROM), a magnetic memory (MRAM), a magnetic disk, and an optical disk.

The emergency braking controller 440 may be configured to perform overall operations of the emergency braking apparatus 400 and include at least one processor.

Further, the emergency braking controller 440 may perform the dangerous situation determination, the required control amount determination, and the like on the basis of the operation algorithm and the information stored in the memory 430.

According to an embodiment, the emergency braking controller 440 may receive, through the receiving part 410, the information (prediction information, detection information, and vehicle state information) provided from the information provision parts 100, 200, and 300 at the front end.

Further, the emergency braking controller 440 may determine whether the emergency braking is required on the basis of the inputted information, determine the control amount (required control amount) required for the emergency braking, and output the determination result to the braking performing apparatus 500 through the transmitting part 420.

The emergency braking controller 440 may perform the operation for the emergency braking when the emergency braking controller 440 determines that the situation determined on the basis of the inputted information is the preset dangerous situation.

The emergency braking controller 440 may determine the time-to-collision (TTC) with respect to the front object on the basis of the detection information, compare the time-to-collision with a preset TTC critical value, and determine that the current situation is a dangerous situation (or a situation requiring emergency braking) when the time-to-collision is smaller than the TTC critical value.

In addition, the emergency braking controller 440 may determine whether the FCA operation determination target value corresponds to a preset emergency braking (FCA) operating area. The emergency braking apparatus 400 may determine that the current situation is the dangerous situation (or the situation requiring emergency braking) when the FCA operation determination target value corresponds to the emergency braking operating area.

According to an embodiment, when the judder prediction information is not inputted (the judder does not occur), the emergency braking controller 440 may determine the dangerous situation on the basis of the preset TTC critical value for the non-occurrence of the judder and the FCA operating area.

According to an embodiment, when the judder prediction information is inputted (the judder occurs), the emergency braking controller 440 may change (or adjust) the preset dangerous situation determination criterion on the basis of the non-occurrence of the judder. For example, the emergency braking controller 440 may change the TTC critical value and change the emergency braking operating area (or the FCA operating area).

The emergency braking controller 440 may select an appropriate TTC critical value from the TTC critical value look-up table for respective judder magnitudes on the basis of the judder magnitude of the inputted judder prediction information, compare the current TTC with the selected TTC critical value, and determine that the current situation is the dangerous situation (or the situation requiring emergency braking).

Figure 3:
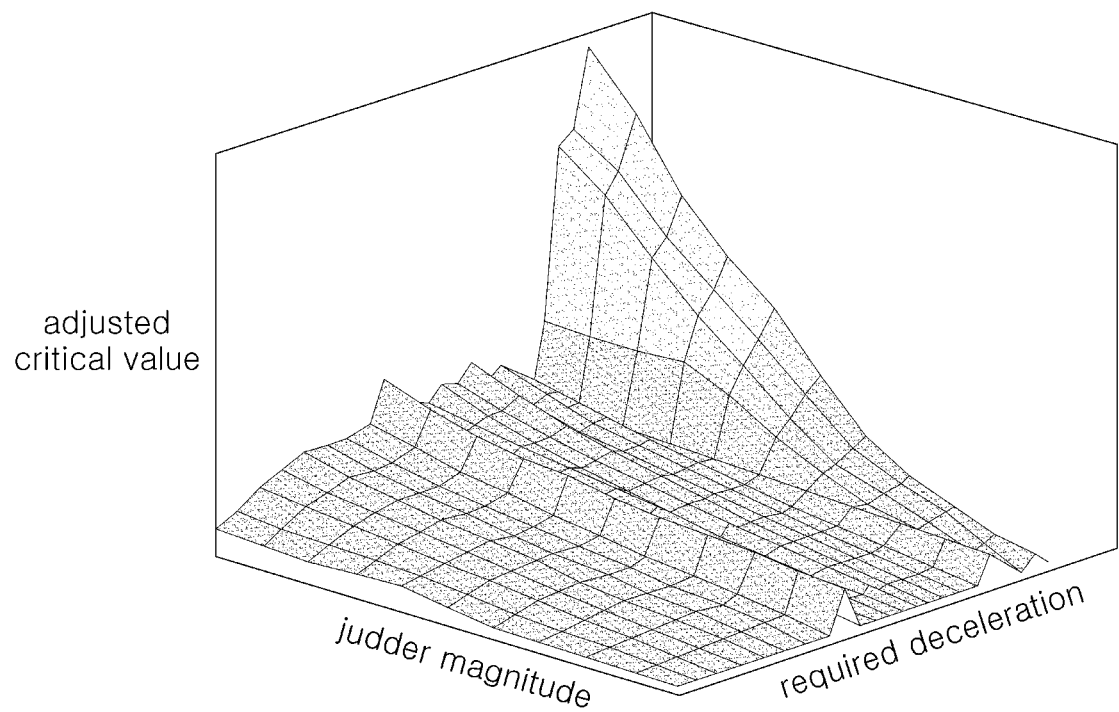
FIG. 3 is a view illustrating an example of a three-dimensional graph related to a TTC critical value look-up table according to an embodiment of the present invention.

FIG. 3 is a view illustrating an example of a three-dimensional graph related to the TTC critical value look-up table according to an embodiment of the present invention.

According to an embodiment, as illustrated in FIG. 3, the emergency braking controller 440 may use the TTC critical value look-up table designed on the basis of the judder magnitude and the required deceleration.

When the TTC critical value look-up table designed on the basis of the two variables (the judder magnitude and the required deceleration) is used as described above, the accurate emergency braking may be performed in comparison with a case in which a TTC critical value look-up table designed on the basis of a single variable (judder magnitude) is used.

According to an embodiment, the emergency braking controller 440 may store a look-up table (a braking deceleration look-up table for respective judder magnitudes) related to braking deceleration ($\alpha_{jud}$) for respective judder magnitudes acquired through a previous braking test.

Therefore, the emergency braking controller 440 may select appropriate braking deceleration ($\alpha_{jud}$) from the braking deceleration look-up table for respective judder magnitudes on the basis of the judder magnitude of the inputted judder prediction information and adjust the emergency braking operating area so that the emergency braking operating area corresponds to the selected braking deceleration ($\alpha_{jud}$).

Further, the emergency braking controller 440 may determine whether the FCA operation determination target value corresponds to the adjusted emergency braking operating area, and the emergency braking controller 440 may determine whether the current situation is the dangerous situation (or the situation requiring emergency braking).

Figure 4:
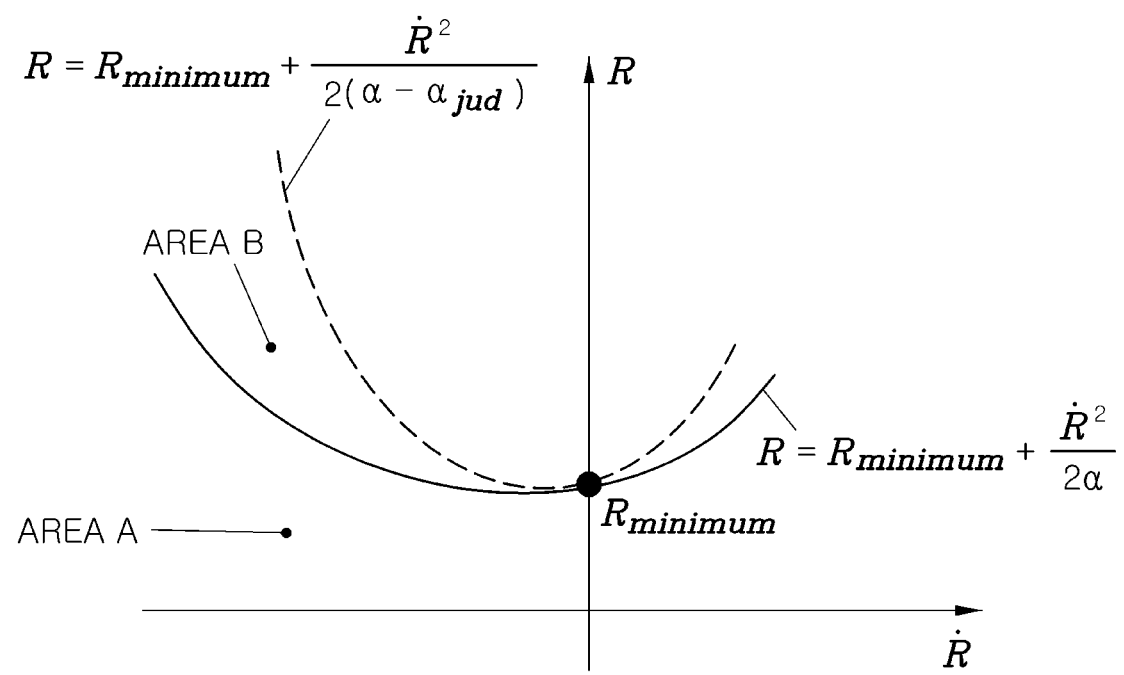
FIG. 4 is a graph schematically illustrating a case in which an emergency braking (FCA) operating area according to an embodiment of the present invention is adjusted.

FIG. 4 is a graph schematically illustrating a case in which the emergency braking (FCA) operating area according to an embodiment of the present invention is adjusted.

In FIG. 4, R represents a relative distance between a host vehicle and a front object, $R_{minimum}$ represents a minimum value of the relative distance, $\dot{R}$ represents a relative velocity between the host vehicle and the front object, $\alpha$ represents the braking deceleration, and $\alpha_{jud}$ represents the braking deceleration that is decreased by the judder.

When no judder occurs, the emergency braking controller 440 may use, as a criterion, a preset FCA operating area (an FCA operating area for the non-occurrence of the judder) (area A) set by using the relative distance R, as FCA operation points, determined on the basis of Equation 1 below.

$$R = R \text{ minimum} + \frac{\dot{R}^2}{2\alpha} \quad \text{Equation 1}$$

When the judder occurs, the emergency braking controller 440 may select the braking deceleration ($\alpha_{jud}$), as a criterion, the FCA operating area (the FCA operating area for the occurrence of the judder) (area B) set by using the relative distance R, as the FCA operation points, determined on the basis of Equation 2 below defined by applying the braking deceleration ($\alpha_{jud}$) to Equation 1.

$$R = R \text{ minimum} + \frac{\dot{R}^2}{2(\alpha - \alpha_{jud})} \quad \text{Equation 2}$$

According to an embodiment, when the current situation is the dangerous situation (or the situation requiring emergency braking), the emergency braking controller 440 may determine the required control amount on the basis of the inputted information. For example, the control amount may include the deceleration and the yaw rate. However, the parameter of the control amount is not limited thereto. According to an embodiment, the emergency braking controller 440 may determine the required deceleration and the required yaw rate.

The emergency braking controller 440 may apply different methods of determining the required control amount depending on whether the judder prediction information is inputted.

According to an embodiment, when the judder prediction information is not inputted, the emergency braking controller 440 may determine the required control amount on the basis of the required control amount determination algorithm for the non-occurrence of the judder (the required control amount determination algorithm according to the FCA braking in the related art).

When the judder prediction information is inputted (the judder occurs), the emergency braking controller 440 determines the compensation values (the deceleration compensation value and the yaw rate compensation value) by applying the compensation coefficient stored in the compensation coefficient look-up table for respective judder magnitudes, and the emergency braking controller 440 may finally determine the required control amount for the occurrence of the judder by applying the determined compensation value to the required control amount for the non-occurrence of the judder.

Figure 5:
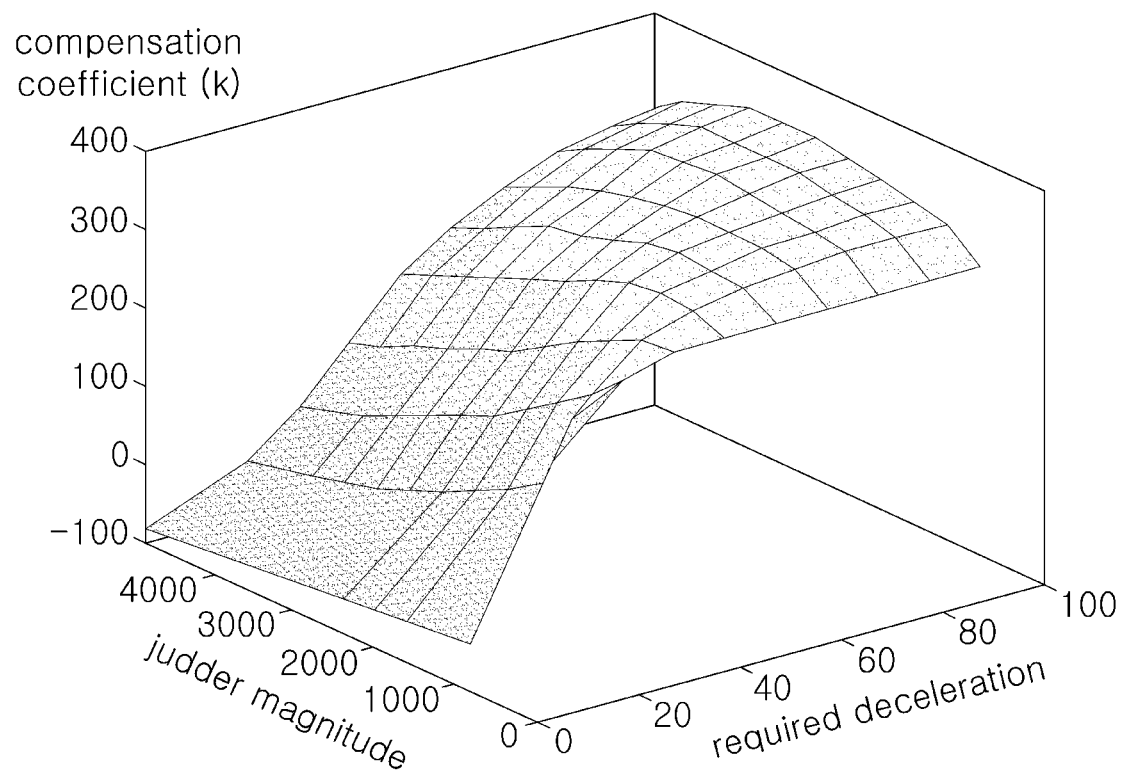
FIG. 5 is a view illustrating an example of a three-dimensional graph related to a compensation coefficient look-up table according to an embodiment of the present invention.

FIG. 5 is a view illustrating an example of a three-dimensional graph related to the compensation coefficient look-up table according to an embodiment of the present invention.

According to an embodiment, as illustrated in FIG. 5, the emergency braking controller 440 may use the compensation coefficient look-up table designed on the basis of the judder magnitude and the required deceleration.

When the compensation coefficient look-up table designed on the basis of the two variables (the judder magnitude and the required deceleration) is used as described above, the accurate emergency braking may be performed in comparison with a case in which a compensation coefficient look-up table designed on the basis of a single variable (judder magnitude) is used.

According to an embodiment, the emergency braking controller 440 may determine the deceleration compensation value ($\alpha_{compensate}$) and the yaw rate compensation value ($\gamma_{compensate}$) on the basis of Equation 3 below (compensation value determination equation).

$$\alpha_{compensate} = K_\alpha * (R_{FL} + R_{FR} + R_{RL} + R_{RR}) * \frac{v_{Sv}^2}{2R} \quad \text{Equation 3}$$

$$\gamma_{compensate} = K_\gamma * (Z_{FR}R_{FR} + Z_{RR}R_{RR} - Z_{FL}R_{FL} - Z_{RL}R_{RL}) * \frac{S}{2}$$

Here, $K_\alpha$ represents a deceleration compensation coefficient, $K_\gamma$ represents a yaw rate compensation coefficient, $R_{FL}$, $R_{FR}$, $R_{RL}$, and $R_{RR}$ respectively represent an FL wheel judder magnitude, an FR wheel judder magnitude, an RL wheel judder magnitude, and an RR wheel judder magnitude, $v_{Sv}$ represents a velocity of the host vehicle, and R represents the relative distance between the host vehicle and the front object.

Further, $Z_{FL}$, $Z_{FR}$, $Z_{RL}$, and $Z_{RR}$ respectively represent an FL wheel side axial load, an FR wheel side axial load, an RL wheel side axial load, and an RR wheel side axial load, and S represents a wheel track distance.

As defined in Equation 3, the deceleration compensation value ($\alpha_{compensate}$) may be determined on the basis of the deceleration compensation coefficient ($K_\alpha$), the judder magnitudes ($R_{FL}$, $R_{FR}$, $R_{RL}$, and $R_{RR}$) for the respective wheels, a host vehicle ($v_{Sv}$), and the relative distance R between the host vehicle and the front object.

Further, the yaw rate compensation value ($\gamma_{compensate}$) may be determined on the basis of the yaw rate compensation coefficient ($K_\gamma$), the judder magnitudes ($R_{FL}$, $R_{FR}$, $R_{RL}$, and $R_{RR}$) for the respective wheels, the axial loads ($Z_{FL}$, $Z_{FR}$, $Z_{RL}$, and $Z_{RR}$) for the respective wheels, and the wheel track distance (S).

The deceleration compensation value ($\alpha_{compensate}$) and the yaw rate compensation value ($\gamma_{compensate}$) may be determined on the basis of Equation 3, and then the emergency braking controller 440 may determine the required deceleration ($\alpha_{desired}$) and the required yaw rate ($\gamma_{desired}$) for the occurrence of the judder on the basis of Equation 4 below.

$$\alpha_{desired} = \alpha_{FCA} + \alpha_{compensate} \quad \text{Equation 4}$$

$$\gamma_{desired} = \gamma_{FCA} + \gamma_{compensate}$$

Figure 6:
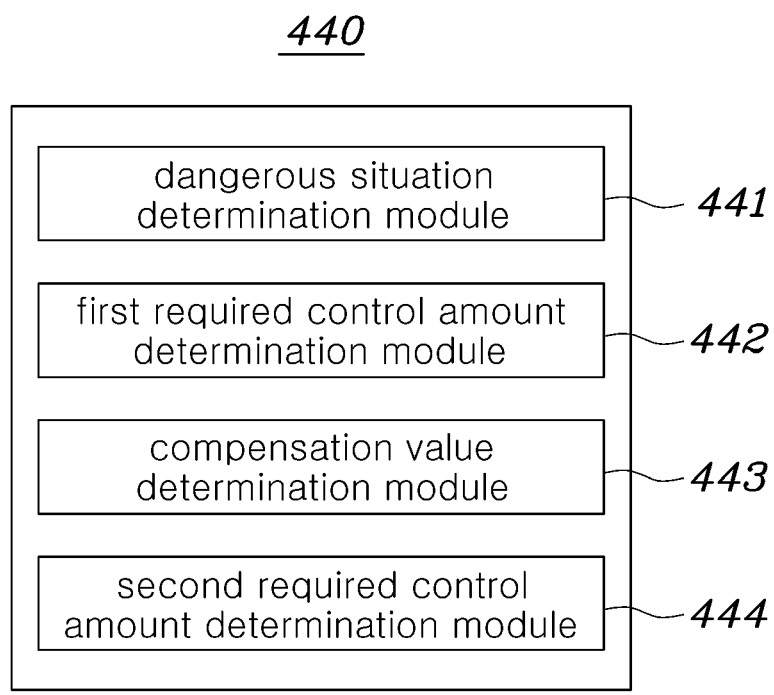
FIG. 6 is a configuration view functionally illustrating an emergency braking controller of the emergency braking apparatus according to an embodiment of the present invention.

FIG. 6 is a configuration view functionally illustrating the emergency braking controller 440 of the emergency braking apparatus 400 according to an embodiment of the present invention.

With reference to FIGS. 1 to 6, the emergency braking controller 440 according to an embodiment may include a dangerous situation determination module 441, a first required control amount determination module 442, a compensation value determination module 443, and a second required control amount determination module 444. However, the configuration of the emergency braking controller 440 is not limited thereto.

The dangerous situation determination module 441 may determine whether the current situation is the dangerous situation on the basis of the information provided from the information provision parts 100, 200, and 300 at the front end.

According to an embodiment, the dangerous situation determination module 441 may determine whether the judder prediction information is inputted.

When the judder prediction information is not inputted, the dangerous situation determination module 441 may determine the dangerous situation on the basis of the dangerous situation determination criterion for the non-occurrence of the judder. When the judder prediction information is inputted, the dangerous situation determination module 441 may determine the dangerous situation by changing (or adjusting) the dangerous situation determination criterion for the occurrence of the judder.

When the judder prediction information is inputted, the dangerous situation determination module 441 may change the TTC critical value and the emergency braking (FCA)

operating area. Because the change in determination criterion has been described previously, a detailed description thereof will be omitted.

When the dangerous situation determination module 441 determines that the current situation is not the dangerous situation, the dangerous situation determination module 441 may consistently perform the determination of the dangerous situation on the basis of the inputted information.

When the dangerous situation determination module 441 determines that the current situation is the dangerous situation, the dangerous situation determination module 441 may output a dangerous situation occurrence signal to at least one of the first required control amount determination module 442, the compensation value determination module 443, and the second required control amount determination module 444.

For example, when the judder prediction information is not inputted, the dangerous situation determination module 441 may output the dangerous situation occurrence signal to the first required control amount determination module 442. When the judder prediction information is inputted, the dangerous situation determination module 441 may output the dangerous situation occurrence signal to the first required control amount determination module 442, the compensation value determination module 443, and the second required control amount determination module 444.

Regardless of whether the judder prediction information is inputted, the dangerous situation determination module 441 outputs the dangerous situation occurrence signal to the first required control amount determination module 442. The dangerous situation determination module 441 may output a dangerous situation occurrence signal for the non-occurrence of the judder or a dangerous situation occurrence signal for the occurrence of the judder to the first required control amount determination module 442 according to the situations so that the first required control amount determination module 442 performs the appropriate operation.

The first required control amount determination module 442 may determine required control amounts ($\alpha_{FCA}$, $\gamma_{FCA}$) on the basis of the required control amount determination algorithm for the non-occurrence of the judder. The determination of the required control amount for the non-occurrence of the judder is performed in accordance with the determination method that is performed during the general FCA braking. Therefore, a detailed description thereof will be omitted.

When the first required control amount determination module 442 receives the dangerous situation occurrence signal for the non-occurrence of the judder, the first required control amount determination module 442 may output the determined required control amount to the braking performing apparatus 500.

When the first required control amount determination module 442 receives the dangerous situation occurrence signal for the occurrence of the judder, the first required control amount determination module 442 may output the determined required control amounts ($\alpha_{FCA}$, $\gamma_{FCA}$) to the second required control amount determination module 444.

The compensation value determination module 443 may determine the compensation value on the basis of the compensation value determination algorithm.

According to an embodiment, the compensation value determination module 443 may acquire the compensation coefficients ($K_\alpha$, $K_\gamma$), which correspond to the judder magnitudes, on the basis of the pre-stored compensation coefficient look-up table for respective judder magnitudes and determine the deceleration compensation value ($\alpha_{compensate}$) and the yaw rate compensation value ($\gamma_{compensate}$) on the basis of Equation 3.

The compensation value determination module 443 may output the determined deceleration compensation value ($\alpha_{compensate}$) and the determined yaw rate compensation value ($\gamma_{compensate}$) to the second required control amount determination module 444.

The second required control amount determination module 444 may determine the final required control amounts ($\alpha_{desired}$, $\gamma_{desired}$) on the basis of Equation 4, the required control amounts ($\alpha_{FCA}$, $\gamma_{FCA}$) from the first required control amount determination module 442, and the compensation values ($\alpha_{compensate}$, $\gamma_{compensate}$) from the compensation value determination module 443.

According to an embodiment, the second required control amount determination module 444 may determine the final required deceleration ($\alpha_{desired}$) by adding the deceleration compensation value ($\alpha_{compensate}$) to the required deceleration ($\alpha_{FCA}$) and determine the final required yaw rate ($\gamma_{desired}$) by adding the yaw rate compensation value ($\gamma_{compensate}$) to the required yaw rate ($\gamma_{FCA}$).

The second required control amount determination module 444 may output the determined final required control amounts ($\alpha_{desired}$, $\gamma_{desired}$) to the braking performing apparatus 500.

Figure 7:
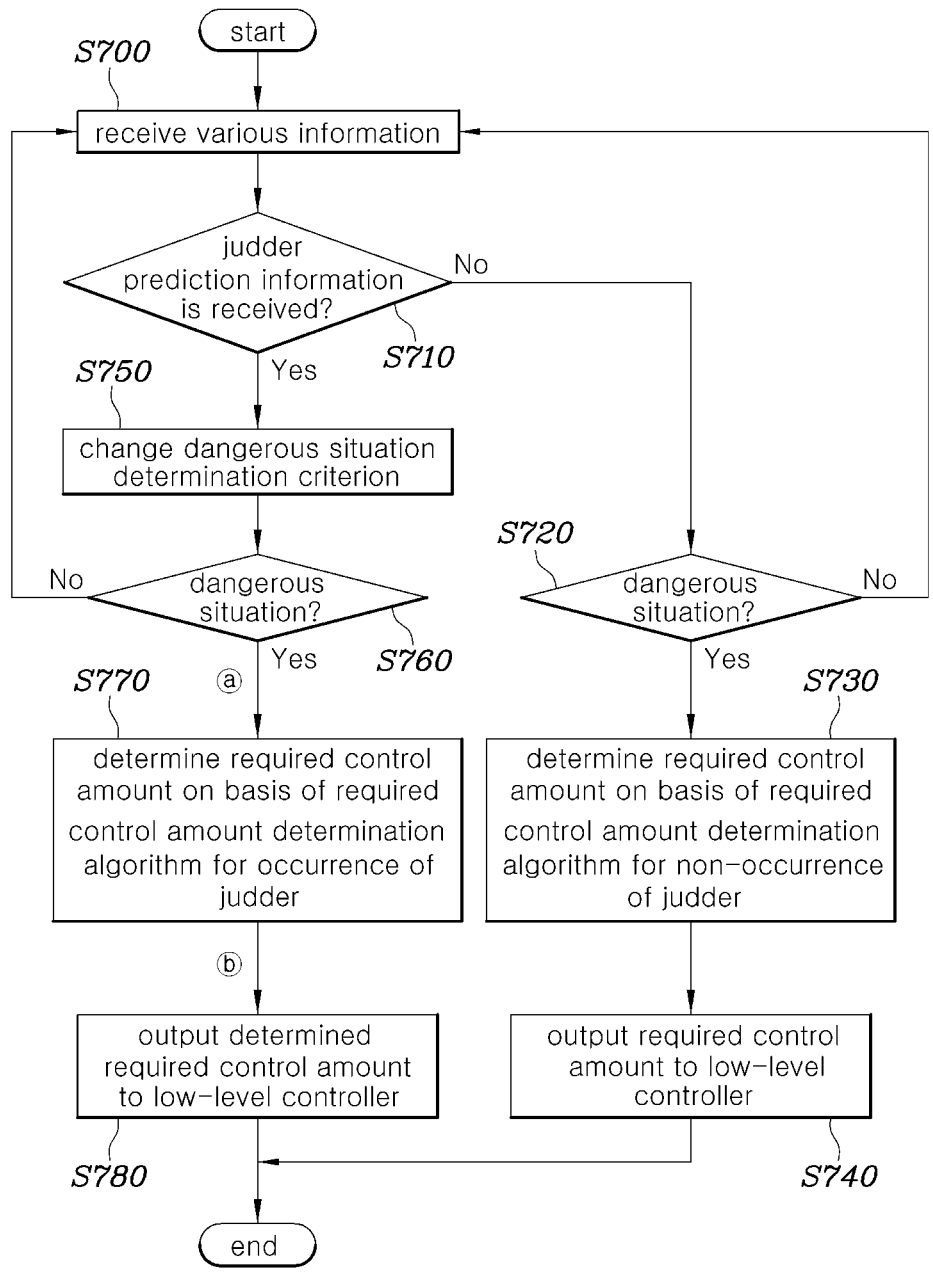
FIG. 7 is a flowchart for explaining an operation of the emergency braking system for a vehicle according to an embodiment of the present invention.

FIG. 7 is a flowchart for explaining an operation of the emergency braking system 1 for a vehicle according to an embodiment of the present invention.

The operations for respective steps illustrated in FIG. 7 may be performed by the emergency braking system 1 described with reference to FIGS. 1 to 6.

Hereinafter, the emergency braking method performed by the emergency braking system 1 for a vehicle will be described with reference to FIGS. 1 to 7, focusing on the operation of the emergency braking apparatus 400 when the emergency braking is performed.

First, the emergency braking apparatus 400 may receive various information (e.g., the judder prediction information, the detection information, and the vehicle state information) for the dangerous situation determination and the required control amount determination (S700) and determine whether the judder prediction information is received (S710).

When the determination result in step S710 indicates that the judder prediction information is not received (NO in S710), the emergency braking apparatus 400 may determine whether the current situation is the dangerous situation on the basis of the received information (S720).

In step S720, the emergency braking apparatus 400 may determine whether the current situation is the dangerous situation on the basis of the dangerous situation determination criterion for the non-occurrence of the judder.

When the determination result in step S720 indicates that the current situation is not the dangerous situation (NO in S720), the emergency braking apparatus 400 may return to step S700 and perform the routine again.

When the determination result in step S720 indicates that current situation is the dangerous situation (YES in S720), the emergency braking apparatus 400 may determine the required control amounts ($\alpha_{FCA}$, $\gamma_{FCA}$) on the basis of the required control amount determination algorithm for the non-occurrence of the judder (S730).

Thereafter, the emergency braking apparatus 400 may output the determined required control amounts ($\alpha_{FCA}$, $\gamma_{FCA}$) to the braking performing apparatus 500 that is the low-level controller (S740).

Meanwhile, when the determination result in step S710 indicates that the judder prediction information is received (YES in S710), the emergency braking apparatus 400 may change the current preset determination criterion (dangerous situation determination criterion for the non-occurrence of the judder) to the dangerous situation determination criterion for the occurrence of the judder (S750) and determine whether the current situation is the dangerous situation on the basis of the changed criterion (S760).

When the determination result in step S760 indicates that the current situation is not the dangerous situation (NO in S760), the emergency braking apparatus 400 may return to step S700 and perform the routine again.

When the determination result in step S760 indicates that current situation is the dangerous situation (YES in S760), the emergency braking apparatus 400 may determine the required control amounts ($\alpha_{desired}$, $\gamma_{desired}$) on the basis of the required control amount determination algorithm for the occurrence of the judder (S770).

Thereafter, the emergency braking apparatus 400 may output the determined required control amounts ($\alpha_{desired}$, $\gamma_{desired}$) to the braking performing apparatus 500 that is the low-level controller (S780).

Figure 8:
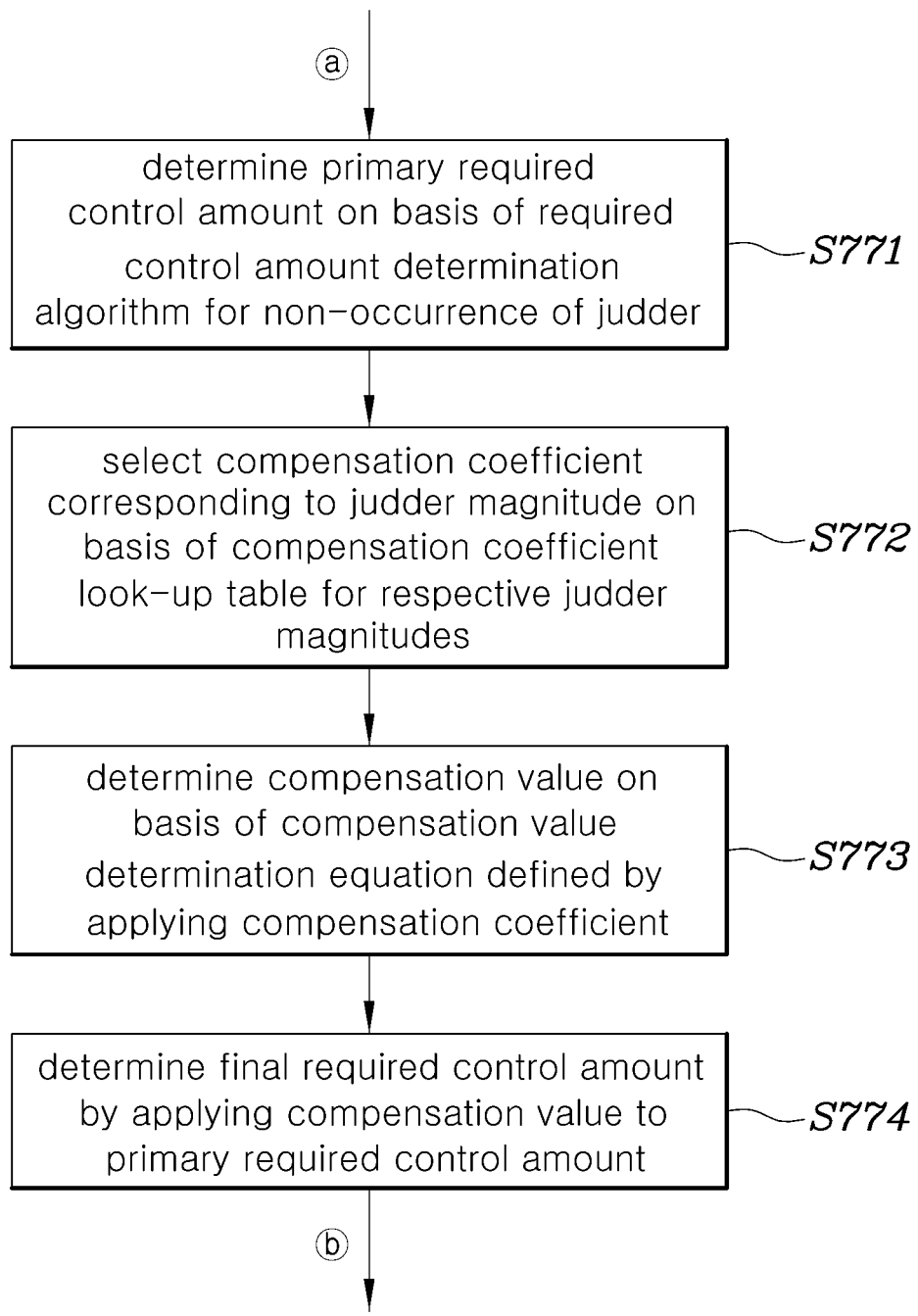
FIG. 8 is a view illustrating a detailed sequence of step S770 in FIG. 7.

FIG. 8 is a view illustrating a detailed sequence of step S770 in FIG. 7.

With reference to FIG. 8, the emergency braking apparatus 400 may determine the primary required control amounts ($\alpha_{FCA}$, $\gamma_{FCA}$) on the basis of the required control amount determination algorithm for the non-occurrence of the judder (S771).

The determination in step S771 may be performed in the same way on the basis of the determination algorithm performed in step S730.

Further, the emergency braking apparatus 400 may select the compensation coefficient K corresponding to the judder magnitude of the judder prediction information on the basis of the compensation coefficient look-up table for respective judder magnitudes (S772).

In step S772, the emergency braking apparatus 400 may select the deceleration compensation coefficient ($K_\alpha$) from the deceleration compensation coefficient look-up table for respective judder magnitudes and select the yaw rate compensation coefficient ($K_\gamma$) from the yaw rate compensation coefficient look-up table for respective judder magnitudes.

Thereafter, the emergency braking apparatus 400 may determine the compensation value on the basis of Equation 3 (compensation value determination equation) defined by applying the compensation coefficient K (S773).

In step S773, the emergency braking apparatus 400 may determine the deceleration compensation value ($\alpha_{compensate}$) and the yaw rate compensation value ($\gamma_{compensate}$).

Thereafter, the emergency braking apparatus 400 may finally determine the required control amounts ($\alpha_{desired}$, $\gamma_{desired}$) by applying the compensation values ($\alpha_{compensate}$, $\gamma_{compensate}$) to the primary required control amounts ($\alpha_{FCA}$, $\gamma_{FCA}$) determined in step S771 (S774).

In step S774, the emergency braking apparatus 400 may determine the required deceleration ($\alpha_{desired}$) by applying the deceleration compensation value ($\alpha_{compensate}$) to the required deceleration ($\alpha_{FCA}$) and determine the required yaw rate ($\gamma_{desire}$) by applying the yaw rate compensation value ($\gamma_{compensate}$) to the required yaw rate ($\gamma_{FCA}$).

For example, the emergency braking apparatus 400 may determine the final required control amount through the addition calculation of the primary required control amount ($\alpha_{FCA}$, $\gamma_{FCA}$) and the compensation value ($\alpha_{compensate}$, $\gamma_{compensate}$).

Although the embodiments of the present invention have been described in detail with reference to the accompanying drawings, the embodiments of the present invention are not limited thereto and may be embodied in many different forms without departing from the technical concept of the present invention. Therefore, the embodiments disclosed in the present specification are provided for illustrative purposes only but not intended to limit the technical spirit of the present invention. The scope of the technical spirit of the present invention is not limited thereby. Therefore, it should be understood that the above-described exemplary embodiments are illustrative in all aspects and do not limit the embodiments of the present invention. The protective scope of the embodiments of the present invention should be construed based on the claims, and all the technical spirit in the equivalent scope thereto should be construed as falling within the scope of the embodiments of the present invention.

What is claimed is:

1. An emergency braking apparatus for a vehicle, the apparatus comprising:
   a memory configured to store a required control amount determination algorithm for non-occurrence of a judder and a required control amount determination algorithm for occurrence of the judder; and
   an emergency braking controller configured to:
      determine whether the judder occurs based on judder prediction information;
      in response to a determination that the judder occurs, determine whether a current situation is a dangerous situation based on vehicle forward detection information and a dangerous situation determination criterion for the occurrence of the judder;
      in response to a determination that the current situation is the dangerous situation, operate based on the required control amount determination algorithm for the occurrence of the judder;
      determine a primary required control amount based on the required control amount determination algorithm for the non-occurrence of the judder;
      select a compensation coefficient corresponding to a judder magnitude;
      determine a compensation value based on the compensation coefficient;
      determine a final required control amount by applying the compensation value to the primary required control amount; and
      output the final required control amount to a braking performing apparatus,
      wherein the braking performing apparatus performs an emergency braking based on the final required control amount.

2. The apparatus of claim 1, wherein the dangerous situation determination criterion comprises a preset time-to-collision (TTC) critical value, and wherein in response to the determination that the judder occurs, the emergency braking controller is configured to:
   change the preset TTC critical value to a TTC critical value corresponding to the judder magnitude based on a TTC critical value look-up table for respective judder magnitudes;
   compare a current TTC with the changed TTC critical value; and
   in response to the current TTC being smaller than the changed TTC critical value, determine that the current situation is the dangerous situation.

3. The apparatus of claim 1, wherein the dangerous situation determination criterion comprises a preset emergency braking operating area, and wherein in response to the determination that the judder occurs, the emergency braking controller is configured to:
change the preset emergency braking operating area to correspond to a braking deceleration corresponding to the judder magnitude based on a braking deceleration look-up table for respective judder magnitudes; and
determine that the current situation is the dangerous situation in response to a relative distance between the vehicle and a front object corresponding to the changed emergency braking operating area, wherein the relative distance is determined based on the braking deceleration and detection information.

4. The apparatus of claim 1, wherein the emergency braking controller is configured to:
select the compensation coefficient corresponding to the judder magnitude based on a compensation coefficient look-up table for respective judder magnitudes; and
determine the compensation value based on an equation $$\alpha_{compensate} = K_\alpha * (R_{FL} + R_{FR} + R_{RL} + R_{RR}) * \frac{v_{sv}^2}{2R}$$

$$\gamma_{compensate} = K_\gamma * (Z_{FR}R_{FR} + Z_{RR}R_{RR} - Z_{FL}R_{FL} - Z_{RL}R_{RL}) * \frac{S}{2}$$

wherein $K_\alpha$ represents a deceleration compensation coefficient, $K_\gamma$ represents a yaw rate compensation coefficient, RFL, RFR, RRL, and RRR respectively represent a front left (FL) wheel judder magnitude, a front right (FR) wheel judder magnitude, a rear left (RL) wheel judder magnitude, and a rear right (RR) wheel judder magnitude, $v_{sv}$ represents a velocity of the vehicle, R represents a relative distance between the vehicle and a front object, ZFL, ZFR, ZRL, and ZRR respectively represent an FL wheel side axial load, an FR wheel side axial load, an RL wheel side axial load, and an RR wheel side axial load, and S represents a wheel track distance.

5. The apparatus of claim 1, wherein the emergency braking controller is configured to determine the final required control amount through an addition calculation of the primary required control amount and the compensation value.

6. The apparatus of claim 1, wherein in response to a determination that the judder does not occur, the emergency braking controller is configured to:
determine whether the current situation is the dangerous situation based on the vehicle forward detection information and a dangerous situation determination criterion for the non-occurrence of the judder; and
in response to the determination that the current situation is the dangerous situation, determine the primary required control amount based on the required control amount determination algorithm for the non-occurrence of the judder.

7. The apparatus of claim 1, wherein the emergency braking controller is configured to:
determine a required deceleration and a required yaw rate as the primary required control amount; and
determine a final required deceleration and a final required yaw rate by applying a deceleration compensation value and a yaw rate compensation value to a determined primary required deceleration and a determined primary required yaw rate.

8. A method of operating an emergency braking apparatus mounted in a vehicle to perform emergency braking of the vehicle, the method comprising:
determining whether a judder occurs based on judder prediction information;
in response to a determination that the judder occurs, determining whether a current situation is a dangerous situation based on vehicle forward detection information and a dangerous situation determination criterion for the occurrence of the judder; and
in response to a determination that the current situation is the dangerous situation, operating based on a required control amount determination algorithm for the occurrence of the judder, wherein operating based on the required control amount determination algorithm for the occurrence of the judder comprises:
determining a primary required control amount for the non-occurrence of the judder;
selecting a compensation coefficient corresponding to a judder magnitude;
determining a compensation value based on the compensation coefficient;
determining a final required control amount by applying the compensation value to the primary required control amount; and
outputting the final required control amount to a braking performing apparatus,
wherein the braking performing apparatus performs an emergency braking based on the final required control amount.

9. The method of claim 8, wherein the dangerous situation determination criterion comprises a preset time-to-collision (TTC) critical value, and wherein determining whether the current situation is the dangerous situation comprises:
changing the preset TTC critical value to a TTC critical value corresponding to the judder magnitude based on a TTC critical value look-up table for respective judder magnitudes;
comparing a current TTC with the changed TTC critical value; and
determining that the current situation is the dangerous situation in response to the current TTC being smaller than the changed TTC critical value.

10. The method of claim 8, wherein the dangerous situation determination criterion comprises a preset emergency braking operating area, and wherein determining whether the current situation is the dangerous situation comprises:
changing the preset emergency braking operating area to correspond to a braking deceleration corresponding to the judder magnitude based on a braking deceleration look-up table for respective judder magnitudes; and
determining that the current situation is the dangerous situation in response to a relative distance between the vehicle and a front object corresponding to the changed emergency braking operating area, wherein the relative distance is determined based on the braking deceleration and detection information.

11. The method of claim 8, wherein determining the compensation value comprises:
selecting the compensation coefficient corresponding to the judder magnitude based on a compensation coefficient look-up table for respective judder magnitudes; and determining the compensation value based on an equation $$\alpha_{compensate} = K_\alpha * (R_{FL} + R_{FR} + R_{RL} + R_{RR}) * \frac{v_{sv}^2}{2R}$$

$$\gamma_{compensate} = K_\gamma * (Z_{FR}R_{FR} + Z_{RR}R_{RR} - Z_{FL}R_{FL} - Z_{RL}R_{RL}) * \frac{S}{2}$$

wherein $K_\alpha$ represents a deceleration compensation coefficient, $K_\gamma$ represents a yaw rate compensation coefficient, RFL, RFR, RRL, and RRR respectively represent a front left (FL) wheel judder magnitude, a front right (FR) wheel judder magnitude, a rear left (RL) wheel judder magnitude, and a rear right (RR) wheel judder magnitude, $v_{sv}$ represents a velocity of the vehicle, R represents a relative distance between the vehicle and a front object, ZFL, ZFR, ZRL, and ZRR respectively represent an FL wheel side axial load, an FR wheel side axial load, an RL wheel side axial load, and an RR wheel side axial load, and S represents a wheel track distance.

12. The method of claim 8, wherein determining the final required control amount comprises determining the final required control amount through an addition calculation of the primary required control amount and the compensation value.

13. The method of claim 8, comprising:
in response to a determination that the judder does not occur, determining whether the current situation is the dangerous situation based on the vehicle forward detection information and a dangerous situation determination criterion for the non-occurrence of the judder; and
in response to the determination that the current situation is the dangerous situation, determining the primary required control amount based on a required control amount determination algorithm for the non-occurrence of the judder.

14. The method of claim 8, wherein operating based on the required control amount determination algorithm for the occurrence of the judder comprises:
determining a required deceleration and a required yaw rate as the primary required control amount; and
determining a final required deceleration and a final required yaw rate by applying a deceleration compensation value and a yaw rate compensation value to a primary required deceleration and a primary required yaw rate.

15. An emergency braking system for a vehicle, the system comprising:
a judder occurrence prediction part configured to predict an occurrence of a judder based on a brake judder occurrence prediction factor and output judder prediction information;
a front detection part configured to detect an object positioned in front of the vehicle and output detection information;
a vehicle sensor part configured to acquire state information of the vehicle and output the state information of the vehicle;
an emergency braking apparatus configured to:
determine whether the judder occurs based on the judder prediction information;
in response to a determination that the judder occurs, determine whether a current situation is a dangerous situation based on vehicle forward detection information and a dangerous situation determination criterion for the occurrence of the judder;
in response to a determination that the current situation is the dangerous situation, operate based on a required control amount determination algorithm for the occurrence of the judder;
determine a primary required control amount based on a required control amount determination algorithm for the non-occurrence of the judder;
select a compensation coefficient corresponding to a judder magnitude;
determine a compensation value based on the compensation coefficient;
determine a final required control amount by applying the compensation value to the primary required control amount; and
output the final required control amount; and
a braking performing apparatus configured to perform an emergency braking based on the final required control amount.

16. The system of claim 15, wherein the judder occurrence prediction part comprises an electronic stability control (ESC) controller.

17. The system of claim 15, wherein the emergency braking apparatus comprises a forward collision-avoidance assist (FCA) system.

18. The system of claim 15, wherein in response to the judder occurrence prediction part predicting the occurrence of the judder, the judder occurrence prediction part is configured to output the judder prediction information including the judder magnitude.

19. The system of claim 15, wherein the dangerous situation determination criterion comprises a preset time-to-collision (TTC) critical value, and wherein in response to the determination that the judder occurs, the emergency braking apparatus is configured to:
change the preset TTC critical value to a TTC critical value corresponding to the judder magnitude based on a TTC critical value look-up table for respective judder magnitudes;
compare a current TTC with the changed TTC critical value; and
in response to the current TTC being smaller than the changed TTC critical value, determine that the current situation is the dangerous situation.

20. The system of claim 15, wherein the dangerous situation determination criterion comprises a preset emergency braking operating area, and wherein in response to the determination that the judder occurs, the emergency braking apparatus is configured to:
change the preset emergency braking operating area to correspond to a braking deceleration corresponding to the judder magnitude based on a braking deceleration look-up table for respective judder magnitudes; and
determine that the current situation is the dangerous situation in response to a relative distance between the vehicle and a front object corresponding to the changed emergency braking operating area, wherein the relative distance is determined based on the braking deceleration and detection information.

* * * * *